Patented Sept. 11, 1928.

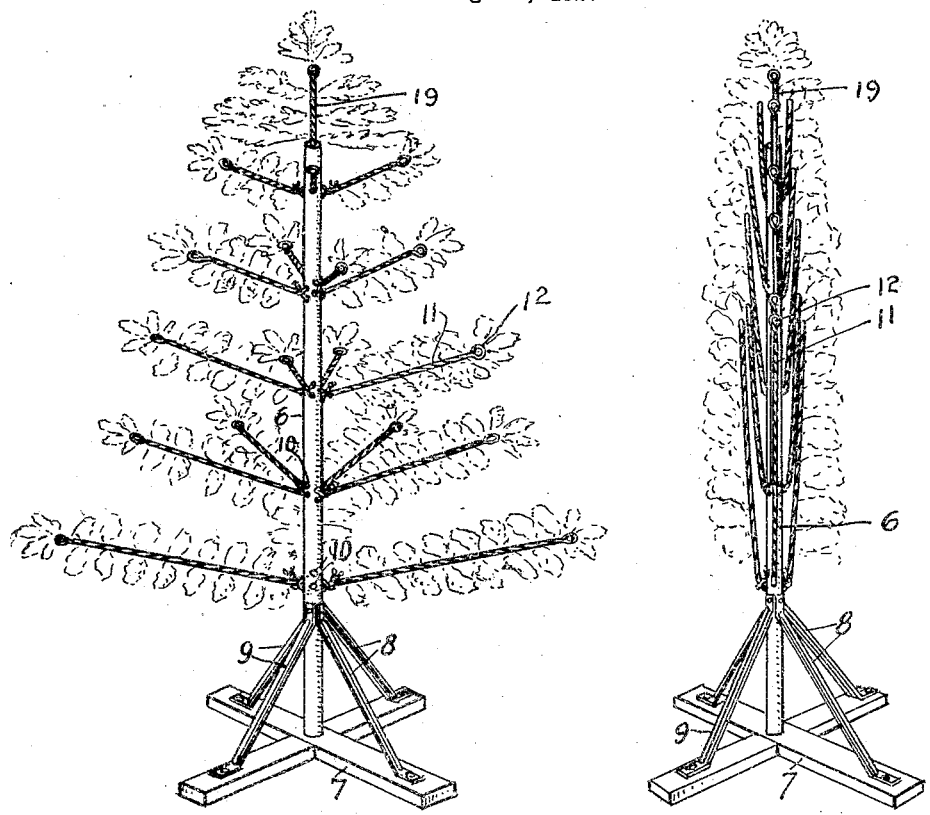

1,683,637

UNITED STATES PATENT OFFICE.

EMMETT H. TRIMPE, OF INDIANAPOLIS, INDIANA, ASSIGNOR TO JAMES A. EVERITT, OF INDIANAPOLIS, INDIANA.

ARTIFICIAL TREE.

Application filed August 26, 1927. Serial No. 215,723.

This invention relates to the construction of artificial trees, such as are popular for Christmas decoration and the object is to provide a tree that will be practically fire proof, that will be symmetrical, handsome, natural in appearance and durable, and the branches of which can be folded practically parallel with the staff or body of the tree for economy in space in shipment and storage, both before and after purchase by the ultimate user thus adapting the tree to be conveniently kept and used year after year.

I accomplish the above, and other objects which will hereinafter appear, by the means illustrated in the accompanying drawing, in which—

Fig. 1, is a perspective view of the staff and branches of a tree in open or spread condition of the branches, the foliage of the branches being indicated by dotted lines.

Fig. 2, is a similar view with the branches in folded position.

Fig. 3, is an underside view of a single branch detached from the staff, showing the details of construction of the branch.

Fig. 4, is a detail in vertical section of a portion of the staff showing the manner of attaching the branches to the staff, and Fig. 5, is a cross section of a staff showing a modified way of securing the branches to the staff.

Like characters of reference indicate like parts in the several views of the drawing.

The tree body or staff 6 is formed out of a sassafras or other suitable wood pole of desired diameter and height. It is mounted on a cross-shaped base 7 and the staff is braced and held in position at right angles with the plane of the base by diagonal braces 8 which preferably have longitudinal ribs 9 to stiffen and strengthen the braces.

Small holes 10, in parallel pairs, are bored diametrically through the staff. The pairs of holes are preferably arranged in groups of two pairs each with each pair of holes out of vertical alinement with adjacent holes above and below, preferably in a spiral pattern, as tree branches grow to make the product more solid and symmetrical in appearance.

The body of each tree branch is formed out of a wire 11, doubled into a loop 12 at its outer end, and the stems 13 and 14, on each side of the loop are twisted together, thereby producing a stronger and a stiffer member. The two ends of the wires 13 and 14 are left untwisted for a suitable distance to reach through the staff and tie together on the other side, but before such assembly is made the branch is draped or dressed with the foliage from a species of American dwarf pine known as Lycopodium, which has been previously dyed a brilliant green color, and which is durable and practically non-inflammable. A pair of these with their stems 15 extending in opposite directions is laid evenly across a twisted wire body, where it is secured by a wrapping of very small wire 16. One side, which will be the top side of the branch when assembled on the tree, will be laid with Lycopodium sprigs 17 to hide the wires between the branches laid crosswise, and the stems of sprigs 17 are wrapped with the small wire 16 as the draping of a branch progresses. The end of the branch is finished by passing the stem of a sprig through the loop 12 and wiring it fast. The branches are made of different lengths to imitate a natural tree having longest branches at the bottom and gradually decreasing in length going upwardly of the tree.

In assembling the branches on staff 6, the wires 13 and 14 of a pair of branches are threaded through opposite ones of a pair of holes 10. Then the projecting loose ends, as shown on the left of the staff 6 in Fig. 4, are brought together and are knotted or twisted as shown on the right hand side of Fig. 4, which retains the assembly, and as the wires are malleable and flexible the branches may be bent down to form a tree as shown in Fig. 1, or folded up as shown in Fig. 2, for storage and transportation.

A suitably dressed, doubled and twisted wire 19 is seated in a socket bored in the upper end of the staff to finish the top of the tree.

The construction above described is my preferred form because the wires 13 and 14 go through the staff in a natural appearance of tree branching, and besides being neat and natural looking is also strong. However, the wires may wrap around the outside of the staff without going through, (not shown), or they may pass through a single hole and also wrap the outside of the staff as shown in Fig. 5. I therefore do not desire to be limited to the construction shown any more than is required by the appended claims.

I claim:

1. In an artificial tree, a staff having holes therethrough, in combination with wires bent double and twisted together and having ends threaded through the holes in the staff and knotted to prevent removal, and a dressing of foliage on the doubled and twisted wires.

2. In an artificial tree, a staff having holes in pairs through it, in combination with a wire for each pair of holes bent double and united by twisting and having their loose ends threaded through respective holes of a pair and twisted together into a knot on the other side to prevent removal, and a dressing on the doubled and twisted wires.

3. In an artificial tree, a staff having holes through it in pairs, in combination with a pair of branches for each pair of holes each branch comprising a wire doubled at its middle and having the resulting adjacent members united by twisting them together except for suitable lengths at their ends which are threaded through the respective holes of a pair in opposite directions for each branch and have ends projecting beyond the staff on its opposite side, said projecting ends being then twisted and knotted together to prevent their withdrawal through the staff.

4. In an artificial tree, a staff having holes through it in pairs, in combination with a pair of branches for each pair of holes each branch comprising a wire doubled at its middle and having the resulting adjacent members united by twisting them together except for suitable lengths at their ends which are threaded through the respective holes of a pair in opposite directions for each branch and have ends projecting beyond the staff on its opposite side, said projecting ends being then twisted and knotted together to prevent their withdrawal through the staff, and a dressing and cover of sprigs of Lycopodium or the like secured to the doubled and twisted wires.

In testimony whereof I affix my signature.

EMMETT H. TRIMPE.